United States Patent
Yamada et al.

(10) Patent No.: US 7,935,764 B2
(45) Date of Patent: May 3, 2011

(54) COMPOSITION OF CARBOXYL ACRYL RESIN AND EPOXY ACRYL RESIN

(75) Inventors: Hideyuki Yamada, Tokyo (JP); Masaaki Saika, Hiratsuka (JP); Hideo Sugai, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 142 days.

(21) Appl. No.: 11/607,003

(22) Filed: Dec. 1, 2006

(65) Prior Publication Data

US 2007/0155917 A1 Jul. 5, 2007

Related U.S. Application Data

(63) Continuation of application No. 10/490,024, filed as application No. PCT/JP02/09629 on Sep. 19, 2002, now abandoned.

(30) Foreign Application Priority Data

Sep. 20, 2001 (JP) ................................. 2001-286006

(51) Int. Cl.
*C08L 33/02* (2006.01)
*C08L 33/14* (2006.01)

(52) U.S. Cl. ...................................................... 525/208

(58) Field of Classification Search ........................ None
See application file for complete search history.

(56) References Cited

U.S. PATENT DOCUMENTS

| | | | |
|---|---|---|---|
| 5,508,352 | A | 4/1996 | Sasaki et al. |
| 5,902,644 | A | 5/1999 | Okumura et al. |
| 5,932,658 | A | 8/1999 | Tanaka et al. |
| 6,037,416 | A | 3/2000 | Iwamoto et al. |
| 6,045,870 | A | 4/2000 | Noura et al. |
| 6,410,647 | B1 | 6/2002 | Yoshioka et al. |
| 6,767,987 | B2 | 7/2004 | Okazaki et al. |

FOREIGN PATENT DOCUMENTS

| | | |
|---|---|---|
| JP | 4-114069 | 4/1992 |
| JP | 2000-109752 | 4/2000 |

*Primary Examiner* — Robert Sellers
(74) *Attorney, Agent, or Firm* — Wenderoth, Lind & Ponack, L.L.P.

(57) ABSTRACT

The present invention provides a curable resin composition comprising:
  (A) an acryl resin having (a) a carboxyl group originating in a carboxyl group-containing polymerizable unsaturated monomer selected from acrylic acid, methacrylic acid, maleic acid and itaconic acid and (b) a carboxyl group originating in a carboxyl group-containing polymerizable unsaturated monomer having a polymerizable carbon-carbon double bond and a carboxyl group separated from the double bond by at least 6 carbon atoms,
  (B) an epoxy group-containing acryl resin and
  (C) a curing catalyst.

10 Claims, No Drawings

COMPOSITION OF CARBOXYL ACRYL RESIN AND EPOXY ACRYL RESIN

This is a continuation of Ser. No. 10/490,024, filed Mar. 19, 2004, now abandoned, which is a 371 of PCT/JP/02/09629, filed Sep. 19, 2002.

TECHNICAL FIELD

The present invention relates to a curable resin composition of a so-called "acid-epoxy base" which is cured by crosslinking reaction between a carboxyl group and an epoxy group, particularly to a curable resin composition which is excellent in a storage stability and an electrostatic coating property and which can form a coating film excellent in a scratch resistance and a heat yellowing resistance. The above curable resin composition can suitably be used as a top coating material for car bodies.

BACKGROUND ART

Carboxyl group-containing vinyl resins, vinyl resins having an epoxy group and a hydroxyl group and curable resin compositions of an acid-epoxy base containing a curing catalyst have already been known, and used as the above carboxyl group-containing vinyl resin is a resin obtained by copolymerizing a carboxyl group-containing polymerizable monomer with a polymerizable monomer having an acid anhydride group to obtain a vinyl resin and semi-esterifying the acid anhydride groups contained in the vinyl resin with monoalcohol (refer to, for example, U.S. Pat. No. 5,508,352 or European Patent Publication No. EP-A-667,371).

The present inventors have investigated in detail the performances of the curable resin composition described above, and it has become clear that a coating film formed from the above resin composition is excellent in an acid resistance, a coating film hardness and a scratch resistance but there is the defect that a storage stability and an electrostatic coating property of the composition and a heat yellowing resistance of the coating film are still poor in terms of practical use.

An object of the present invention is to solve the defect described above without reducing the performances of a coating film such as an acid resistance, a coating film hardness and a scratch resistance in a conventional acid-epoxy base curable resin composition.

Intensive researches repeated by the present inventors have resulted in finding that the object described above can be achieved by using as a carboxyl group-containing resin, a specific acryl resin having a carboxyl group originating in a carboxyl group-containing polymerizable unsaturated monomer selected from acrylic acid, methacrylic acid, maleic acid and itaconic acid and a carboxyl group originating in a carboxyl group-containing polymerizable unsaturated monomer having a polymerizable carbon-carbon double bond and a carboxyl group separated from the double bond by at least 6 carbon atoms, and they have come to complete the present invention.

DISCLOSURE OF THE INVENTION

Thus, provided according to the present invention is a curable resin composition (hereinafter referred to as the "present composition 1") comprising:

(A) a carboxyl group-containing acryl resin having (a) a carboxyl group originating in a carboxyl group-containing polymerizable unsaturated monomer selected from acrylic acid, methacrylic acid, maleic acid and itaconic acid and (b) a carboxyl group originating in a carboxyl group-containing polymerizable unsaturated monomer having a polymerizable carbon-carbon double bond and a carboxyl group separated from the double bond by at least 6 carbon atoms, (B) an epoxy group-containing acryl resin and (C) a curing catalyst.

Further, provided according to the present invention is a curable resin composition (hereinafter referred to as the "present composition 2") comprising:

(D) a carboxyl group-containing acryl resin having (a) a carboxyl group originating in a carboxyl group-containing polymerizable unsaturated monomer selected from acrylic acid, methacrylic acid, maleic acid and itaconic acid, (b) a carboxyl group originating in a carboxyl group-containing polymerizable unsaturated monomer having a polymerizable carbon-carbon double bond and a carboxyl group separated from the double bond by at least 6 carbon atoms and (e) a carboxyl group originating in a semi-esterification product of a polymerizable unsaturated dibasic acid anhydride, (B) an epoxy group-containing acryl resin and (C) a curing catalyst.

The present composition 1 and the present composition 2 shall be explained below in further details.

DETAILED DESCRIPTION OF THE INVENTION

Present Composition 1

The present composition 1 provided by the present invention is a curable resin composition comprising a carboxyl group-containing acryl resin (A), an epoxy group-containing acryl resin (B) and a curing catalyst (C) which shall be described below.

Carboxyl Group-containing Acryl Resin (A)

The carboxyl group-containing acryl resin (hereinafter referred to as the "component (A)") constituting the present composition 1 is an acryl resin having in a molecule, (a) a carboxyl group originating in a carboxyl group-containing polymerizable unsaturated monomer selected from acrylic acid, methacrylic acid, maleic acid and itaconic acid and (b) a carboxyl group originating in a carboxyl group-containing polymerizable unsaturated monomer having a polymerizable carbon-carbon double bond and a carboxyl group separated from the double bond by at least 6 carbon atoms.

The above component (A) can be obtained by, for example, copolymerizing (a) a carboxyl group-containing polymerizable unsaturated monomer selected from acrylic acid, methacrylic acid, maleic acid and itaconic acid, (b) a carboxyl group-containing polymerizable unsaturated monomer having a polymerizable carbon-carbon double bond and a carboxyl group separated from the double bond by at least 6 carbon atoms and (c) an acryl base monomer.

The monomer (a) is a polymerizable monomer selected from acrylic acid, methacrylic acid, maleic acid and itaconic acid, and they can be used alone or in combination of two or more kinds thereof.

The monomer (b) is a carboxyl group-containing polymerizable unsaturated monomer having a polymerizable carbon-carbon double bond and a carboxyl group separated from the double bond by at least 6 carbon atoms, preferably 6 to 25 carbon atoms and more preferably 6 to 20 carbon atoms. In the monomer (b), an atomic group formed by at least 6 carbon atoms present between the polymerizable carbon-carbon double bond and the carboxyl group by may be linear or branched or may have an alicyclic structure or an aromatic structure.

In this case, the "polymerizable carbon-carbon double bond" is a polymerizable group represented by —C=C—, and the carboxyl group can be represented by —COOH. Carbon atoms contained in the above groups are not included in "at least 6 carbon atoms". On the other hand, carbon atoms contained in an "ester bond" which is present in an atomic group between the polymerizable carbon-carbon double bond and the carboxyl group are included in "at least 6 carbon atoms".

The above monomer (b) can readily be prepared by any of the following methods (1) to (3).

(1) A Method in Which Lactones are Subjected to Ring-Opening Esterification with Acrylic Acid and/or Methacrylic Acid (Hereinafter Referred as "(Meth)acrylic Acid".

Lactones are cyclic compounds having an ester group in a ring and include the compounds having 3 to 17 rings, and, for example, α-lactone, β-lactone, γ-lactone, δ-lactone and ε-lactone can suitably be used. The ring-opening esterification of (meth)acrylic acid with lactones can be carried out by a conventionally known method, and the number of carbon atoms contained an atomic group between the polymerizable carbon-carbon double bond and the carboxyl group can optionally be controlled by changing the kind and the amount of the lactones used.

(2) A method in which a terminal hydroxyl group of a product obtained by subjecting (meth)acrylic acid to esterification with glycols in almost the same mole ratio is subjected to semi-esterification with dicarboxylic acids in almost the same mole ratio.

The number of carbon atoms contained in an atomic group between the polymerizable carbon-carbon double bond and the carboxyl group can readily be controlled by the number of carbon atoms contained in the glycols and the dicarboxylic acids.

The glycols used in the method (2) described above are compounds having two hydroxyl groups in a molecule and include, for example, aliphatic glycols such as ethylene glycol, propylene glycol, diethylene glycol, trimethylene glycol, tetraethylene glycol, triethylene glycol, dipropylene glycol, butanediol, methyl-butanediol, pentanediol, dimethyltrimethylene glycol, tetramethylene glycol, methyl-pentanediol, trimethyl-pentanediol, hexanediol, cyclohexanediol, cyclohexanedimethanol, neopentyl glycol and hydroxypivalic acid neopentyl glycol ester; alicyclic glycols such as cyclohexanedimethanol, trichlorodecanedimethanol, hydrogenate bisphenol A, hydrogenate bisphenol F and alkylene oxide adducts thereof; aromatic glycols such as bisphenol A, bisphenol F and alkylene oxide adducts thereof; polyester glycols such as bis(hydroxyethyl)terephthalate; polyether glycols such as polyethylene glycol, polypropylene glycol and polybutylene glycol; and polylactone glycols obtained by adding lactones such as ε-caprolactone to the above glycols.

(Meth)acrylic acid can be reacted with the glycols by subjecting both components to esterification in almost the same mole ratio by a known method. The monomer (b) can be obtained by subjecting a hydroxyl group contained in the product thus obtained to semi-esterification with dicarboxylic acids in almost the same mole ratio.

The dicarboxylic acids described above are compounds having two carboxyl groups in a molecule and include, for example, aromatic dicarboxylic acids such as terephthalic acid, isophthalic acid, phthalic acid, naphthalenedicarboxylic acid, biphenyldicarboxylic acid and diphenylmethanedicarboxylic acid and anhydrides thereof; alicyclic dicarboxylic acids such as hexahydroisophthalic acid, hexahydroterephthalic acid, hexahydrophthalic acid and tetrahydrophthalic acid and anhydrides thereof; and aliphatic dicarboxylic acids such as adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid and dimer acid and anhydrides thereof.

(3) A Method for Subjecting a Hydroxyl Group-Containing Polymerizable Unsaturated Monomer to Semi-Esterification with Saturated Dicarboxylic Acids.

The hydroxyl group-containing polymerizable unsaturated monomer is a compound having each one polymerizable carbon-carbon double bond and one carboxyl group in a molecule and include, for example, monoesterified products of (meth)acrylic acid and glycols such as alkylene glycols having 2 to 20 carbon atoms and polyether glycols, such as hydroxyethyl acrylate, hydroxyethyl methacrylate, hydroxypropyl acrylate, hydroxypropyl methacrylate, hydroxybutyl acrylate and hydroxybutyl methacrylate.

The saturated dicarboxylic acids are compounds containing no polymerizable unsaturated bond and having two carboxyl groups in a molecule and include, for example, aromatic dicarboxylic acids such as terephthalic acid, isophthalic acid, phthalic acid, naphthalenedicarboxylic acid, biphenyldicarboxylic acid and diphenylmethanedicarboxylic acid and anhydrides thereof; alicyclic dicarboxylic acids such as hexahydroisophthalic acid, hexahydroterephthalic acid, hexahydrophthalic acid and tetrahydrophthalic acid and anhydrides thereof; and aliphatic dicarboxylic acids such as adipic acid, sebacic acid, suberic acid, succinic acid, glutaric acid, dodecanoic diacid, pimelic acid, azelaic acid and dimer acid and anhydrides thereof. Among them, dicarboxylic anhydrides are preferred.

It is estimated that the semi-esterification is carried out by reacting one of two carboxyl groups contained in the saturated dicarboxylic acids with one hydroxyl group of the hydroxyl group-containing polymerizable unsaturated monomer in a proportion of one mole of the saturated dicarboxylic acids to one mole of the hydroxyl group-containing polymerizable unsaturated monomer. If the saturated dicarboxylic acids are anhydrides, ring-opening esterification is carried out.

Esters of (meth)acrylic acid other than the monomers (a) and (b) described above are included in the acryl base monomer (c) used for producing the component (A). They include, for example, alkyl esters or cycloalkyl esters having 1 to 24 carbon atoms with (meth)acrylic acid, such as methyl acrylate, ethyl acrylate, n-propyl acrylate, isopropyl acrylate, butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, butyl methacrylate, hexyl methacrylate, 2-ethylhexyl methacrylate, octyl methacrylate, decyl methacrylate, lauryl methacrylate, stearyl methacrylate and cyclohexyl methacrylate; and alkoxyalkyl esters having 2 to 18 carbon atoms with (meth)acrylic acid, such as methoxybutyl acrylate, methoxybutyl methacrylate, methoxyethyl acrylate, methoxyethyl methacrylate, ethoxybutyl acrylate and ethoxybutyl methacrylate.

The component (A) can be obtained by copolymerizing the monomer (a), the monomer (b) and the acryl base monomer (c) each described above, and the other polymerizable monomer (d) than the above monomers may be copolymerized therewith if necessary.

The other polymerizable monomer (d) include those given below as examples.

(i) Hydroxyl group-containing polymerizable monomer:
$C_2$ to $C_8$ hydroxyalkyl esters of (meth)acrylic acid, such as hydroxyethyl(meth)acrylate, hydroxypropyl(meth)

acrylate and hydroxybutyl(meth)acrylate; monoesters of polyetherpolyols such as polyethylene glycol, polypropylene glycol and polybutylene glycol with unsaturated carboxylic acids such as (meth)acrylic acid; monoethers of polyetherpolyols such as polyethylene glycol, polypropylene glycol and polybutylene glycol with hydroxyl group-containing unsaturated monomers such as 2-hydroxyethyl(meth)acrylate; adducts of $\alpha,\beta$-unsaturated carboxylic acids and monoepoxy compounds such as Cardula E10 (manufactured by Shell Chemical Co., Ltd.) and $\alpha$-olefin epoxide; adducts of glycidyl(meth)acrylate and monobasic acids such as acetic acid, propionic acid, t-butylbenzoic acid and fatty acids; monoesterified products or diesterified products of acid anhydride group-containing unsaturated compounds such as maleic anhydride and itaconic anhydride with glycols such as ethylene glycol, 1,6-hexanediol and neopentyl glycol; hydroxyalkyl vinyl ethers such as hydroxyethyl vinyl ether; and allyl alcohol.

(ii) Fluorine-containing polymerizable monomer: perfluoroalkyl(meth)acrylates such as perfluorobutylethyl (meth)acrylate, perfluoroisononylethyl(meth)acrylate and perfluorooctylethyl(meth)acrylate.

(iii) Aromatic polymerizable monomer: styrene, $\alpha$-methylstyrene, vinyltoluene and $\alpha$-chlorostyrene.

(iv) Nitrogen-containing polymerizable monomer: nitrogen-containing alkyl(meth)acrylate such as N,N-dimethylaminoethyl(meth)acrylate, N,N-diethylaminoethyl(meth)acrylate and N-t-butylaminoethyl(meth)acrylate; (meth)acrylamides such as acrylamide, methacrylamide, N-methyl(meth)acrylamide, N-ethyl(meth)acrylamide, N-methylol(meth)acrylamide, N-methoxymethyl(meth)acrylamide, N-butoxymethyl(meth)acrylamide, N,N-dimethyl(meth)acrylamide, N,N-dimethylaminopropyl(meth)acrylamide and N,N-dimethylaminoethyl(meth)acrylamide; aromatic nitrogen-containing monomer such as 2-vinylpyridine and 1-vinyl-2-pyrrolidone; acrylonitrile and allylamine.

The component (A) can be obtained by using (a) the carboxyl group-containing polymerizable unsaturated monomer selected from acrylic acid, methacrylic acid, maleic acid and itaconic acid, (b) the carboxyl group-containing polymerizable unsaturated monomer having a polymerizable carbon-carbon double bond and a carboxyl group separated from the double bond by at least 6 carbon atoms and (c) the acryl base monomer as the essential components and, if necessary, (d) the other polymerizable unsaturated monomer and copolymerizing these monomers by a conventional solution radical polymerization method.

The use proportions of these respective monomers shall not strictly be restricted and can optionally be selected according to the use purposes of the present composition 1. In general, the monomer (a) can be used in such a proportion that an acid value based on the monomer (a) of the component (A) formed falls in a range of 30 to 150 mg KOH/g, particularly 40 to 120 mg KOH/g and further particularly 50 to 120 mg KOH/g, and the monomer (b) can be used in such a proportion that an acid value based on the monomer (b) of the component (A) formed falls in a range of 30 to 170 mg KOH/g, particularly 40 to 140 mg KOH/g and further particularly 40 to 120 mg KOH/g. Also, the total acid value of the acid value based on the monomer (a) and the acid value based on the monomer (b) falls preferably in a range of usually 100 to 200 mg KOH/g, particularly 130 to 180 mg KOH/g and further particularly 140 to 170 mg KOH/g. Further, the monomer (c) is used in a proportion falling suitably in a range of usually 10 to 80% by weight, particularly 20 to 70% by weight and further particularly 30 to 50% by weight based on the total amount of the monomers (a), (b) and (c). On the other hand, the monomer (d) is used in a proportion falling suitably in a range of usually 100 parts by weight or less, particularly 1 to 50 parts by weight and further particularly 5 to 20 parts by weight per 100 parts by weight of the total amount of the monomers (a), (b) and (c).

The component (A) thus obtained has preferably a hydroxyl value falling in a range of usually 0 to 50 mg KOH/g, particularly 0 to 30 mg KOH/g and a weight average molecular weight falling in a range of 2000 to 50000, particularly 3000 to 25000.

In producing the component (A) by using the monomer (a), the monomer (b) and the monomer (c) and, if necessary, the polymerizable monomer (d) and copolymerizing them, the plural monomers (b) in which an atomic group present between a polymerizable carbon-carbon double bond and a carboxyl group has a carbon atom number of at least 6, preferably 6 to 25 and in which the carbon atom numbers are different from each other can be used in combination, if necessary, as the monomer (b).

A difference in the carbon atom numbers of the atomic groups present in the plural monomers (b) in which the above carbon atom numbers are different from each other falls preferably in a range of usually at least 1, particularly 2 to 10. Thus, assuming, for example, that the monomer in which an atomic group has a small carbon atom number is (b-1) and that the monomer in which an atomic group has a large carbon atom number is (b-2), the atomic group present in the monomer (b-2) has preferably a carbon atom number falling in a range of 10 to 25. On the other hand, the monomer in which an atomic group has a smaller carbon atom number by at least one, particularly 2 to 10 than that of the above monomer is preferably used as the monomer (b-1).

That is, capable of being also used as the component (A) is a carboxyl group-containing acryl resin obtained by using (a) the carboxyl group-containing polymerizable unsaturated monomer selected from acrylic acid, methacrylic acid, maleic acid and itaconic acid, (b-1) the carboxyl group-containing polymerizable unsaturated monomer in which an atomic group present between a polymerizable carbon-carbon double bond and a carboxyl group has a smaller carbon atom number by at least one, particularly 2 to 10 than that of the monomer (b-2) described below, (b-2) the carboxyl group-containing polymerizable unsaturated monomer in which an atomic group present between a polymerizable carbon-carbon double bond and a carboxyl group has a carbon atom number of 10 to 25 and (c) the acryl base monomer and, if necessary, (d) the other polymerizable unsaturated monomer than the monomers described above and copolymerizing them. In this respect, a use proportion of the monomer (b-1) and the monomer (b-2) shall not strictly be restricted. In general, that of the monomer (b-1) falls suitably in a range of 10 to 90% by weight, particularly 30 to 70% by weight based on the total amount of the monomer (b-1) and the monomer (b-2), and that of the monomer (b-2) falls suitably in a range of 90 to 10% by weight, particularly 70 to 30% by weight.

Further, it is possible that prepared are the plural monomers (b) in which an atomic group present between a polymerizable carbon-carbon double bond and a carboxyl group has a carbon atom number of at least 6, preferably 6 to 25 and in which the carbon atom numbers are different from each other, for example, the monomer (b-1) and the monomer (b-2) each described above; the monomer (b-1) and the monomer (b-2) each are copolymerized separately with the monomer (a) and the monomer (c) and, if necessary, the other monomer (d) than the monomers described above to produce plural acryl resins (A); and they are used in a mixture. To be specific, capable of being used as the component (A) is a mixture of a carboxyl group-containing acryl resin (A-1) obtained by using the monomer (a), the monomer (b-1) and the monomer (c) and, if necessary, the other monomer (d) than the monomers described above and copolymerizing them and a carboxyl group-containing acryl resin (A-2) obtained by using the monomer (a), the monomer (b-2) and the monomer (c) and, if necessary, the other monomer (d) than the monomers described above and copolymerizing them.

The proportions of the respective monomers constituting the acryl resin (A-1) and the acryl resin (A-2) can be those described above. Further, in respect to a mixed proportion of both of these resins, that of the acryl resin (A-1) falls suitably in a range of 10 to 90% by weight, particularly 20 to 80% by weight based on the total solid matter amount of the resins (A-1) and (A-2), and that of the acryl resin (A-2) falls suitably in a range of 90 to 10% by weight, particularly 80 to 20% by weight.

Epoxy Group-containing Acryl Resin (B):

The epoxy group-containing acryl resin (hereinafter referred to as the "component (B)") constituting the present composition 1 is an acryl resin having at least one epoxy group and, if necessary, a hydroxyl group in a molecule.

The above component (B) can be obtained by copolymerizing an epoxy group-containing polymerizable monomer and an acryl base monomer as essential components and, if necessary, a hydroxyl group-containing polymerizable monomer and/or the other polymerizable monomer. Preferably, the component (B) does not substantially contain a carboxyl group.

The epoxy group-containing polymerizable monomer is a compound having at least one epoxy group and at least one polymerizable double bond respectively in a molecule and includes, for example, glycidyl acrylate and glycidyl methacrylate.

The acryl base monomer is esters of (meth)acrylic acid other than the epoxy group-containing polymerizable monomer. It includes, for example, alkyl esters or cycloalkyl esters having 1 to 24 carbon atoms with (meth)acrylic acid, such as methyl acrylate, ethyl acrylate, n-propyl acrylate, isopropyl acrylate, butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, butyl methacrylate, hexyl methacrylate, 2-ethylhexyl methacrylate, octyl methacrylate, decyl methacrylate, lauryl methacrylate, stearyl methacrylate and cyclohexyl methacrylate; and alkoxyalkyl esters having 2 to 18 carbon atoms with (meth)acrylic acid, such as methoxybutyl acrylate, methoxybutyl methacrylate, methoxyethyl acrylate, methoxyethyl methacrylate, ethoxybutyl acrylate and ethoxybutyl methacrylate.

The hydroxyl group-containing polymerizable monomer is a compound having at least one hydroxyl group and at least one polymerizable double bond respectively in a molecule and includes, for example, $C_2$ to $C_8$ hydroxyalkyl esters of (meth)acrylic acid, such as hydroxyethyl(meth)acrylate, hydroxypropyl(meth)acrylate and hydroxybutyl(meth)acrylate; monoesters of polyetherpolyols such as polyethylene glycol, polypropylene glycol and polybutylene glycol with unsaturated carboxylic acids such as (meth)acrylic acid; monoethers of polyetherpolyols such as polyethylene glycol, polypropylene glycol and polybutylene glycol with hydroxyl group-containing unsaturated monomers such as 2-hydroxyethyl(meth)acrylate; adducts of α,β-unsaturated carboxylic acids and monoepoxy compounds such as Cardula E10 (manufactured by Shell Chemical Co., Ltd.) and α-olefin epoxide; adducts of glycidyl(meth)acrylate and monobasic acids such as acetic acid, propionic acid, t-butylbenzoic acid and fatty acids; monoesterified products or diesterified products of acid anhydride group-containing unsaturated compounds such as maleic anhydride and itaconic anhydride with glycols such as ethylene glycol, 1,6-hexanediol and neopentyl glycol; hydroxyalkyl vinyl ethers such as hydroxyethyl vinyl ether; and allyl alcohol.

The other polymerizable monomer is a compound having at least one polymerizable unsaturated bond in a molecule other than the epoxy group-containing polymerizable monomer, the acryl base monomer and the hydroxyl group-containing polymerizable monomer each described above. To be specific, capable of being suitably used are those selected from (ii) the fluorine-containing polymerizable monomer, (iii) the aromatic polymerizable monomer and (iv) the nitrogen-containing polymerizable monomer in "the other polymerizable monomer (d)" given as the example in the explanation of the component (A) described above.

The component (B) can be obtained by using the epoxy group-containing polymerizable monomer and the acryl base monomer as the essential components and, if necessary, the hydroxyl group-containing polymerizable monomer and/or the other polymerizable unsaturated monomer each described above and copolymerizing these monomers by a conventional solution radical polymerization method.

The use proportions of the above monomers shall not strictly be restricted and can optionally be selected according to the use purposes of the present composition 1. To be specific, that of the epoxy group-containing polymerizable monomer falls suitably in a range of usually 20 to 85% by weight, particularly 30 to 70% by weight and further particularly 40 to 70% by weight, and that of the acryl base monomer falls suitably in a range of usually 80 to 15% by weight, particularly 70 to 30% by weight and further particularly 60 to 30% by weight based on the total amount of the epoxy group-containing polymerizable monomer and the acryl base monomer. The hydroxyl group-containing polymerizable monomer is used preferably in an amount falling in a range of usually 100 parts by weight or less, particularly 10 to 60 parts by weight and further particularly 15 to 40 parts by weight per 100 parts by weight of the total amount of the epoxy group-containing polymerizable monomer and the acryl base monomer, and the other polymerizable unsaturated monomer is used preferably in an amount falling in a range of 100 parts by weight or less, particularly 1 to 50 parts by weight and further particularly 3 to 30 parts by weight per 100 parts by weight of the total amount of the epoxy group-containing polymerizable monomer and the acryl base monomer.

The component (B) thus obtained can have a weight average molecular weight falling in a range of 2000 to 50000, particularly 3000 to 10000 and has preferably an epoxy equivalent falling in a range of usually 50 to 1000, preferably 100 to 800. Further, the component (B) can have a hydroxyl value falling in a range of usually 10 to 300 mg KOH/g, particularly 40 to 150 mg KOH/g.

Curing Catalyst (C):

The curing catalyst (hereinafter referred to as the "component (C)") constituting the present composition 1 is used in order to accelerate cross-linking reaction of the component (B) with an epoxy group, and to be specific, it includes, for example, phosphoric esters such as monobutyl phosphate, dimethyl phosphate, dibutyl phosphate, di-2-ethylhexyl phosphate and neopentyl glycol diglycidyl ether phosphate; quaternary ammonium salts such as tetrabutylammonium bromide, tetradodecyltrimethylammonium bromide and benzyltrimethylammonium bromide; and phosphate base compounds such as tetrabutylphosphonium salts. Combined use of quaternary ammonium salts and phosphate base compounds out of them elevates a storage stability of the present composition 1 and therefore is preferred. A use proportion of the phosphate base compounds falls preferably in a range of usually 50 to 150 parts by weight, particularly 60 to 130 parts by weight per 100 parts by weight of the quaternary ammonium salt.

The present composition 1 can be prepared by mixing the component (A), the component (B) and the component (C) each described above in an organic solvent. The mixing proportions of these respective components can optionally be selected according to the use purposes of the present composition 1; in general, that of the component (A) falls suitably in a range of usually 20 to 80% by weight, particularly 30 to 70% by weight and further particularly 40 to 60% by weight based on the total solid matter weight of the component (A) and the component (B); that of the component (B) falls suitably in a range of usually 80 to 20% by weight, particularly 70 to 30% by weight and further particularly 60 to 40% by weight; and that of the component (C) falls preferably in a range of usually 0.1 to 5 parts by weight, particularly 0.5 to 3 parts by weight and further particularly 1 to 2.5 parts by weight per 100 parts by weight of the total solid matter of the component (A) and the component (B).

The present composition 1 can be blended, if necessary, with a hydroxyl group-containing polyester resin, a solid color pigment, a metallic pigment, a light coherent pigment, an extender pigment, a UV absorber, a light stabilizer, a coated face-controlling agent and a precipitation inhibitor in addition to the component (A), the component (B) and the component (C).

Further, the present composition 1 can contain, in addition to the component (A), the component (B) and the component (C), the following component (E), that is, a carboxyl group-containing acryl resin which can be obtained by using the carboxyl group-containing monomer (b) described above having a polymerizable carbon-carbon double bond and a carboxyl group separated from the double bond by at least 6 carbon atoms, the acryl base monomer (c) described above and a semi-esterification product (e) of a polymerizable unsaturated dibasic acid anhydride which shall be described later and, if necessary, the other polymerizable monomer (d) described above and copolymerizing these monomers by a conventional solution radical polymerization method.

The use proportions of these respective components in producing the component (E) can optionally be selected according to the use purposes of the present composition 1. In general, the monomer (e) can be used in such a proportion that the acid value based on the monomer (e) of the component (E) formed falls in a range of 30 to 150 mg KOH/g, particularly 40 to 120 mg KOH/g and further particularly 50 to 100 mg KOH/g, and the monomer (b) can be used in such a proportion that the acid value based on the monomer (b) of the component (E) formed falls in a range of 30 to 170 mg KOH/g, particularly 40 to 140 mg KOH/g and further particularly 50 to 120 mg KOH/g. The total acid value of the acid value based on the monomer (e) and the acid value based on the monomer (b) falls preferably in a range of usually 100 to 200 mg KOH/g, particularly 130 to 180 mg KOH/g and further particularly 140 to 160 mg KOH/g. Further, the monomer (c) falls suitably in a range of usually 10 to 80% by weight, particularly 20 to 70% by weight and further particularly 30 to 60% by weight based on the total amount of the monomers (e), (b) and (c). On the other hand, the monomer (d) is used preferably in a range of usually 100 parts by weight or less, particularly 1 to 50 parts by weight and further particularly 5 to 40 parts by weight per 100 parts by weight of the total amount of the monomers (e), (b) and (c).

The component (E) thus obtained has preferably a hydroxyl value falling in a range of usually 0 to 50 mg KOH/g, particularly 3 to 40 mg KOH/g and a weight average molecular weight falling in a range of 2000 to 50000, particularly 3000 to 25000.

A blending amount of the component (E) in the present composition 1 falls suitably in a range of usually 0 to 30 parts by weight, particularly 0 to 20 parts by weight and further particularly 1 to 15 parts by weight per 100 parts by weight of the total solid matter of the component (A) and the component (B).

The present composition 1 is excellent in a storage stability and an electrostatic coating property and can form a coating film which is excellent in a scratch resistance, a hardness, a heat yellowing resistance and an acid resistance, and therefore it can advantageously be used as a top coating material for car bodies to which the above coating film performances are required, for example, a solid color coating material, a metallic coating material, a light coherent coating material and a clear coating material, among them, a thermosetting clear top coating material.

Present Composition 2

The present composition 2 provided by the present invention is a curable resin composition comprising:
  (D) a carboxyl group-containing acryl resin having (a) a carboxyl group originating in a carboxyl group-containing polymerizable unsaturated monomer selected from acrylic acid, methacrylic acid, maleic acid and itaconic acid and (b) a carboxyl group originating in a carboxyl group-containing polymerizable unsaturated monomer having a polymerizable carbon-carbon double bond, a carboxyl group separated from the double bond by at least 6 carbon atoms and (e) a carboxyl group originating in a semi-esterification product of a polymerizable unsaturated dibasic acid anhydride,
  (B) an epoxy group-containing acryl resin and
  (C) a curing catalyst.

The same ones as the component (B) and the component (C) each described above in the present composition 1 can be used as the component (B) (epoxy group-containing acryl resin) and the component (C) (curing catalyst) each described above constituting the present composition 2.

Accordingly, the carboxyl group-containing acryl resin (D) described above shall be described below in further details.

Carboxyl Group-containing Acryl Resin (D)

The carboxyl group-containing acryl resin (hereinafter referred to as the "component (D)") constituting the present composition 2 is an acryl resin having (a) a carboxyl group originating in a carboxyl group-containing polymerizable unsaturated monomer selected from acrylic acid, methacrylic acid, maleic acid and itaconic acid, (b) a carboxyl group originating in a carboxyl group-containing polymerizable unsaturated monomer having a polymerizable carbon-carbon double bond and a carboxyl group separated from the double bond by at least 6 carbon atoms and (e) a carboxyl group originating in a semi-esterification product of a polymerizable unsaturated dibasic acid anhydride.

The component (D) can be obtained by copolymerizing (a) a carboxyl group-containing polymerizable unsaturated monomer selected from acrylic acid, methacrylic acid, maleic acid and itaconic acid, (b) a carboxyl group-containing polymerizable unsaturated monomer having a polymerizable carbon-carbon double bond and a carboxyl group separated from the double bond by at least 6 carbon atoms, (e) a semi-esterification product of a polymerizable unsaturated dibasic acid anhydride and (c) an acryl base monomer and, if necessary, (d) the other polymerizable unsaturated monomer than the above monomers by a conventional solution radical polymerization method.

The same ones as the monomer (a), the monomer (b), the monomer (c) and the monomer (d) each described above in the present composition 1 can be used as the monomer (a), the monomer (b), the monomer (c) and the monomer (d) among the above monomers.

On the other hand, the semi-esterification product (e) of a polymerizable unsaturated dibasic acid anhydride can be produced, to be specific, by subjecting an acid anhydride group of a compound having at least one polymerizable carbon-carbon double and at least one cyclic acid anhydride group in a molecule to ring-opening reaction with monoalcohol to produce one free carboxyl group (—COOH) and one carboxylic acid ester group (—COOR) per one acid anhydride group.

The compound having at least one polymerizable carbon-carbon double and at least one cyclic acid anhydride group in a molecule includes, for example, maleic anhydride and itaconic anhydride. The monoalcohol can have 1 to 12, preferably 1 to 7 carbon atoms and includes, for example, methanol, ethanol, propanol, butanol, methyl cellosolve and ethyl cellosolve. The semi-esterification of the cyclic acid anhydride group-containing compound with the monoalcohol can be carried out by a conventionally known method. The above semi-esterification can be carried out before copolymerizing the monomer (a), the monomer (b), the monomer (c) and the monomer (d) or can be carried out as well after the copolymerization.

The use proportions of the respective monomers of the monomer (a), the monomer (b), the monomer (e), the monomer (c) and the monomer (d) in the copolymerization described above shall not strictly be restricted and can optionally be selected according to the use purposes of the present composition 2. In general, the monomer (a) can be used in such a proportion that the acid value based on the monomer (a) of the component (D) formed falls in a range of 30 to 150 mg KOH/g, particularly 40 to 120 mg KOH/g and further particularly 50 to 100 mg KOH/g, and the monomer (b) can be used in such a proportion that the acid value based on the monomer (b) of the component (D) formed falls in a range of 30 to 170 mg KOH/g, particularly 40 to 140 mg KOH/g and further particularly 50 to 120 mg KOH/g. Also, the semi-esterification product (e) is used preferably in such a proportion that the acid value based on the semi-esterification product (e) of the component (D) formed falls in a range of 1 to 60 mg KOH/g, particularly 5 to 50 mg KOH/g and further particularly 10 to 40 mg KOH/g. Further, the total acid value of the acid value based on the monomer (a), the acid value based on the monomer (b) and the acid value based on the monomer (e) falls preferably in a range of usually 100 to 200 mg KOH/g, particularly 130 to 180 mg KOH/g and further particularly 140 to 170 mg KOH/g. Also, the monomer (c) falls suitably in a range of usually 10 to 80% by weight, particularly 20 to 70% by weight and further particularly 30 to 60% by weight based on the total amount of the monomers (a), (b), (c) and (e). On the other hand, the monomer (d) is used preferably in a range of usually 100 parts by weight or less, particularly 1 to 50 parts by weight and further particularly 5 to 40 parts by weight per 100 parts by weight of the total amount of the monomers (a), (b), (c) and (e).

The component (D) thus obtained has preferably a hydroxyl value falling in a range of usually 0 to 50 mg KOH/g, particularly 5 to 40 mg KOH/g and a weight average molecular weight falling in a range of 2000 to 50000, particularly 3000 to 25000.

In producing the component (D) by using the monomer (a), the monomer (b), the monomer (e) and the monomer (c) and, if necessary, the polymerizable monomer (d) and copolymerizing them, the plural monomers (b) in which an atomic group present between a polymerizable carbon-carbon double bond and a carboxyl group has a carbon atom number of at least 6, preferably 6 to 25 and in which the carbon atom numbers are different from each other can be used in combination, if necessary, as the monomer (b).

A difference in the carbon atom numbers of the above atomic groups present in the plural monomers (b) in which the above carbon atom numbers are different from each other falls preferably in a range of usually at least 1, particularly 2 to 10. Thus, assuming that the monomer in which an atomic group has a small carbon atom number is (b-1) and that the monomer in which an atomic group has a large carbon atom number is (b-2), the atomic group present in the monomer (b-2) has preferably a carbon atom number falling in a range of 10 to 25. On the other hand, the monomer in which an atomic group has a smaller carbon atom number by at least one, particularly 2 to 10 than that of the above monomer is preferably used as the monomer (b-1).

That is, capable of being also used as the component (D) is a carboxyl group-containing acryl resin obtained by using (a) the carboxyl group-containing polymerizable unsaturated monomer selected from acrylic acid, methacrylic acid, maleic acid and itaconic acid, (b-1) the carboxyl group-containing polymerizable unsaturated monomer in which an atomic group present between a polymerizable carbon-carbon double bond and a carboxyl group has a smaller carbon atom number by at least one, particularly 2 to 10 than that of the monomer (b-2) described below, (b-2) the carboxyl group-containing polymerizable unsaturated monomer in which an atomic group present between a polymerizable carbon-carbon double bond and a carboxyl group has a carbon atom number of 10 to 25, (e) the semi-esterification product and (c) the acryl base monomer and, if necessary, (d) the other polymerizable unsaturated monomer than the monomers described above and copolymerizing them. In this respect, a use proportion of the monomer (b-1) and the monomer (b-2) shall not strictly be restricted. In general, that of the monomer (b-1) falls suitably in a range of 10 to 90% by weight, particularly 30 to 70% by weight based on the total amount of the monomer (b-1) and the monomer (b-2), and that of the monomer (b-2) falls suitably in a range of 90 to 10% by weight, particularly 70 to 30% by weight.

Further, it is possible that prepared are the plural monomers (b) in which an atomic group present between a polymerizable carbon-carbon double bond and a carboxyl group has a carbon atom number of at least 6, preferably 6 to 25 and in which the carbon atom numbers are different from each other, for example, the monomer (b-1) and the monomer (b-2) each described above; the monomer (b-1) and the monomer (b-2) each are copolymerized separately with the monomer (a), the semi-esterification product (e) and the monomer (c) and, if necessary, the other monomer (d) than the monomers described above to produce plural acryl resins (D); and they are used in a mixture. To be specific, capable of being used as the component (D) is a mixture of a carboxyl group-containing acryl resin (D-1) obtained by using in combination, the monomer (a), the monomer (b-1), the semi-esterification product (e) and the monomer (c) and, if necessary, the other monomer (d) than the monomers described above and copolymerizing them and a carboxyl group-containing acryl resin (D-2) obtained by using in combination, the monomer (a), the monomer (b-2), the semi-esterification product (e) and the monomer (c) and, if necessary, the other monomer (d) than the monomers described above and copolymerizing them.

The proportions of the respective monomers constituting the acryl resin (D-1) and the acryl resin (D-2) can be those described above. Further, in respect to a mixed proportion of both of these resins, that of the acryl resin (D-1) falls suitably in a range of 10 to 90% by weight, particularly 20 to 80% by weight based on the total solid matter amount of the resins (D-1) and (D-2), and the acryl resin (D-2) falls suitably in a range of 90 to 10% by weight, particularly 80 to 20% by weight.

The present composition 2 can be prepared by mixing the component (D), the component (B) and the component (C) each described above in an organic solvent. The mixing proportions of these respective components can optionally be selected according to the use purposes of the present composition 2; in general, that of the component (D) falls suitably in a range of usually 20 to 80% by weight, particularly 30 to 70% by weight and further particularly 35 to 65% by weight based on the total solid matter weight of the component (D) and the component (B); that of the component (B) falls suitably in a range of usually 80 to 20% by weight, particularly 70 to 30% by weight and further particularly 65 to 35% by weight; and that of the component (C) falls preferably in a range of usually 0.1 to 5 parts by weight, particularly 0.5 to 3 parts by weight and further particularly 1 to 2.5 parts by weight per 100 parts by weight of the total solid matter of the component (D) and the component (B).

The present composition 2 can be blended, if necessary, with a hydroxyl group-containing polyester resin, a solid color pigment, a metallic pigment, a light coherent pigment, an extender pigment, a UV absorber, a light stabilizer, a coated face-controlling agent and a precipitation inhibitor in addition to the component (A), the component (B) and the component (C).

The present composition 2 is excellent in a storage stability and an electrostatic coating property and can form a coating film which is excellent in a scratch resistance, a hardness, a heat yellowing resistance and an acid resistance, and therefore it can advantageously be used as a top coating material for car bodies to which the above coating film performances are required, for example, a solid color coating material, a metallic coating material, a light coherent coating material and a clear coating material, among them, a thermosetting clear top coating material.

EXAMPLES

The present invention shall more specifically be explained below with reference to examples and comparative example. Parts and percentage in the blending amounts are based on weight in principle, and a film thickness of the coating films is that of the cured coating film.

1. Preparation of Sample (1) Production of a Carboxyl Group-containing Polymerizable Unsaturated Monomer Having a Polymerizable Carbon-carbon Double Bond and a Carboxyl Group Separated from the Double Bond by at Least 6 Carbon Atoms:

Production Example 1

A flask of 5 liter equipped with a stirrer, a thermometer and a cooling tube was charged with 27 parts of "Uker Ester EEP" (trade name, hydrocarbon base organic solvent, manufactured by Union Carbide Co., Ltd.), 101 parts of succinic acid and 0.1 part of hydroquinone monomethyl ether (polymerization inhibitor) and heated to 110° C. on a mantle heater. Then, 144 parts (mole ratio: OH/succinic acid=1/1.01) of 4-hydroxybutyl acrylate was dropwise added thereto in 2 hours, and then the solution was ripened for one hour to obtain a carboxyl group-containing polymerizable unsaturated monomer (b-1).

Production Example 2

A flask of 5 liter equipped with a stirrer, a thermometer and a cooling tube was charged with 57.5 parts of "Uker Ester EEP", 101 parts of succinic acid and 0.1 part of hydroquinone monomethyl ether (polymerization inhibitor) and heated to 110° C. on a mantle heater. Then, 130 parts (mole ratio: OH/succinic acid=1/1.01) of hydroxyethyl methacrylate was dropwise added thereto in 2 hours, and then the solution was ripened for 3 hours to obtain a carboxyl group-containing polymerizable unsaturated monomer (b-2).

Production Example 3

A flask of 5 liter equipped with a stirrer, a thermometer and a cooling tube was charged with 124 parts of "Uker Ester EEP", 156 parts of hexahydrophthalic anhydride and 0.1 part of hydroquinone monomethyl ether (polymerization inhibitor) and heated to 110° C. on a mantle heater. Then, 342 parts (mole ratio: OH/hexahydrophthalic anhydride=1/1.01) of "Praxel FA2" (2 moles of a ring-opened $\epsilon$-caprolactone chain-containing polymerizable unsaturated monomer having a hydroxyl group at an end, manufactured by Daicel Chemical Ind. Co., Ltd.) was dropwise added thereto in 2 hours, and then the solution was ripened for one hour to obtain a carboxyl group-containing polymerizable unsaturated monomer (b-3).

(2) Production of Acryl Resin (A) Having a Carboxyl Group Originating in the Carboxyl Group-containing Polymerizable Unsaturated Monomer (a) and a Carboxyl Group Originating in the Carboxyl Group-containing Polymerizable Unsaturated Monomer (b):

Production Example 4

A flask of 5 liter equipped with a stirrer, a thermometer and a cooling tube was charged with 900 parts of "Swasol 1000" (trade name, hydrocarbon base organic solvent, manufactured by Cosmo Petroleum Co., Ltd.) and 900 parts of "Uker Ester EEP" and heated to 125° C. on a mantle heater. Then, a polymerizable monomer mixture having the following composition was dropwise added thereto in 4 hours.

Polymerizable Monomer Mixture:

| | |
|---|---|
| styrene | 300 parts |
| isobutyl methacrylate | 1150 parts |
| acrylic acid | 250 parts |
| the carboxyl group-containing polymerizable unsaturated monomer (b-1) and | 1450 parts |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour, followed by ripening it for one hour to obtain an acryl resin solution (A-1) having a solid content of about 55%. This acryl resin had a weight average molecular weight of about 6000 and a total acid value of 156 mg KOH/g. The breakdown of the acid value was an acid value of 65 mg KOH/g based on acrylic acid (carboxyl group-containing polymerizable monomer (a)) and an acid value of 91 mg KOH/g based on the carboxyl group-containing monomer (b).

Production Example 5

A flask of 5 liter equipped with a stirrer, a thermometer and a cooling tube was charged with 900 parts of "Swasol 1000" and 900 parts of "Uker Ester EEP" and heated to 125° C. on a mantle heater. Then, a polymerizable monomer mixture having the following composition was dropwise added thereto in 4 hours.
Polymerizable Monomer Mixture:

| | |
|---|---|
| styrene | 300 parts |
| isobutyl methacrylate | 1182 parts |
| methacrylic acid | 282 parts |
| the carboxyl group-containing monomer (b-2) | 1236 parts |
| and | |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour, followed by ripening it for one hour to obtain an acryl resin solution (A-2) having a solid content of about 55%. This acryl resin had a weight average molecular weight of about 6000 and a total acid value of 160 mg KOH/g. The breakdown of the acid value was an acid value of 60 mg KOH/g based on methacrylic acid (carboxyl group-containing polymerizable unsaturated monomer (a)) and an acid value of 100 mg KOH/g based on the carboxyl group-containing polymerizable unsaturated monomer (b).

Production Example 6

A flask of 5 liter equipped with a stirrer, a thermometer and a cooling tube was charged with 900 parts of "Swasol 1000" and 900 parts of "Uker Ester EEP" and heated to 125° C. on a mantle heater. Then, a polymerizable monomer mixture having the following composition was dropwise added thereto in 4 hours.
Polymerizable Monomer Mixture:

| | |
|---|---|
| styrene | 300 parts |
| isobutyl methacrylate | 1050 parts |
| methacrylic acid | 528 parts |
| the carboxyl group-containing monomer (b-3) | 1122 parts |
| and | |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour. Further, the mixture was ripened for one hour to obtain an acryl resin solution (A-3) having a solid content of about 55%. This acryl resin had a weight average molecular weight of about 6000 and a total acid value of 160 mg KOH/g. The breakdown of the acid value was an acid value of 110 mg KOH/g based on methacrylic acid (carboxyl group-containing polymerizable unsaturated monomer (a)) and an acid value of 50 mg KOH/g based on the carboxyl group-containing polymerizable unsaturated monomer (b).

Production Example 7

A flask of 5 liter equipped with a stirrer, a thermometer and a cooling tube was charged with 900 parts of "Swasol 1000" and 900 parts of "Uker Ester EEP" and heated to 125° C. on a mantle heater. Then, a polymerizable monomer mixture having the following composition was dropwise added thereto in 4 hours.
Polymerizable Monomer Mixture:

| | |
|---|---|
| styrene | 300 parts |
| isobutyl methacrylate | 927 parts |
| isobutyl acrylate | 927 parts |
| methacrylic acid | 846 parts |
| and | |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour. Further, the mixture was ripened for one hour to obtain an acryl resin solution (A-4) having a solid content of about 55%. This acryl resin had a weight average molecular weight of about 6000 and an acid value of 160 mg KOH/g.

Production Example 8

A flask of 5 liter equipped with a stirrer, a thermometer and a cooling tube was charged with 900 parts of "Swasol 1000" and 900 parts of "Uker Ester EEP" and heated to 125° C. on a mantle heater. Then, a polymerizable monomer mixture having the following composition was dropwise added thereto in 4 hours.
Polymerizable Monomer Mixture:

| | |
|---|---|
| styrene | 300 parts |
| isobutyl methacrylate | 508 parts |
| isobutyl acrylate | 508 parts |
| the carboxyl group-containing monomer (b-3) | 1683 parts |
| and | |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour, followed by ripening it for one hour to obtain an acryl resin solution (A-5) having a solid content of about 55%. This acryl resin had a weight average molecular weight of about 6000 and an acid value of 160 mg KOH/g.

Production Example 9

A flask of 5 liter equipped with a stirrer, a thermometer and a cooling tube was charged with 680 parts of "Swasol 1000" and heated to 125° C. on a mantle heater. Then, a polymerizable monomer mixture having the following composition was dropwise added thereto in 4 hours.
Polymerizable Monomer Mixture:

| | |
|---|---|
| styrene | 700 parts |
| maleic anhydride | 600 parts |

| isobutyl methacrylate | 1100 parts |
| the carboxyl group-containing monomer (b-1) and | 600 parts |
| p-tert-butylperoxy-2-ethyl hexanoate | 240 parts. |

Then, the mixture was ripened for 30 minutes, and a mixture of 15 parts of p-tert-butylperoxy-2-ethyl hexanoate and 80 parts of "Swasol 1000" was dropwise added thereto in one hour. Then, the flask was once cooled down to 60° C., and 590 parts of methanol (for opening the ring) and 5 parts of triethylamine were added thereto, followed by heating and refluxing the solution for 6 hours. Thereafter, 391 parts of surplus methanol was removed under reduced pressure to obtain an acryl resin solution (A-6) having a solid content of about 55%. This acryl resin had a weight average molecular weight of about 4500, a whole acid value of 157 mg KOH/g and a half acid value of 156 mg KOH/g.

Production Example 10

A flask of 5 liter equipped with a stirrer, a thermometer and a cooling tube was charged with 680 parts of "Swasol 1000" and heated to 125° C. on a mantle heater. Then, a polymerizable monomer mixture having the following composition was dropwise added thereto in 4 hours.
Polymerizable Monomer Mixture:

| styrene | 700 parts |
| maleic anhydride | 900 parts |
| isobutyl methacrylate and | 1400 parts |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour. Then, the flask was once cooled down to 60° C., and 885 parts of methanol (for opening the ring) and 7 parts of triethylamine were added thereto, followed by heating and refluxing the solution for 6 hours. Thereafter, 586 parts of surplus methanol was removed under reduced pressure to obtain an acryl resin solution (A-7) having a solid content of about 55%. This acryl resin had a weight average molecular weight of about 4500, a whole acid value of 157 mg KOH/g and a half acid value of 156 mg KOH/g.

(3) Production of Epoxy Group-containing Acryl Resin (B):

Production Example 11

A flask of 5 liter equipped with a stirrer, a thermometer and a cooling tube was charged with 600 parts of "Swasol 1000" and 400 parts of dimethoxybutyl acetate and heated to 140° C. on a mantle heater. Then, a polymerizable monomer mixture having the following composition was dropwise added thereto in 4 hours.
Polymerizable Monomer Mixture:

| styrene | 100 parts |
| isobutyl acrylate | 250 parts |
| isobornyl acrylate | 250 parts |
| glycidyl methacrylate | 900 parts |

| 4-hydroxybutyl acrylate and | 500 parts |
| 2,2'-azobis(2-methylbutyronitrile) | 120 parts. |

Then, the mixture was ripened for 30 minutes, and a mixture of 10 parts of 2,2'-azobis(2-methylbutyronitrile) and 300 parts of "Swasol 1000" was dropwise added thereto in one hour to obtain an acryl resin solution (B-1) having an epoxy group and a hydroxyl group in a molecule and having a solid content of about 60%. This acryl resin having an epoxy group had a weight average molecular weight of 3000, an epoxy equivalent of 609 and a hydroxyl value of 97 mg KOH/g.

Production Example 12

A flask of 5 liter equipped with a stirrer, a thermometer and a cooling tube was charged with 900 parts of "Swasol 1000" and 900 parts of "Uker Ester EEP" and heated to 125° C. on a mantle heater. Then, a polymerizable monomer mixture having the following composition was dropwise added thereto in 4 hours.
Polymerizable Monomer Mixture:

| styrene | 300 parts |
| isobutyl methacrylate | 1347 parts |
| acrylic acid | 192 parts |
| the carboxyl group-containing monomer (b-1) | 912 parts |
| a methanol-semi-esterified product of maleic anhydride and | 249 parts |
| p-tert-butylperoxy-2-ethyl hexanoate | 180 parts. |

Then, the mixture was ripened for 30 minutes, and a mixture of 15 parts of p-tert-butylperoxy-2-ethyl hexanoate and 80 parts of "Swasol 1000" was dropwise added thereto in one hour, followed by ripening it for one hour to obtain an acryl resin solution (D-1) having a solid content of about 55%. This acryl resin had a weight average molecular weight of about 6000 and a total acid value of 156 mg KOH/g. The breakdown of the acid value was an acid value of 50 mg KOH/g based on acrylic acid (carboxyl group-containing polymerizable monomer (a)), an acid value of 70 mg KOH/g based on the carboxyl group-containing polymerizable monomer (b) and an acid value of 70 mg KOH/g based on the methanol-semi-esterified product of maleic anhydride.

(4) Production of Coating Material (WB-1) for Water-based Color Base Coat:

Production Example 13

Preparation of Acryl Resin Aqueous Dispersion (W-1)

A reactor was charged with 140 parts of deionized water, 2.5 parts of "NEWCol 707SF" (trade name, surfactant, solid content: 30%, manufactured by Nippon Nyukazai Co., Ltd.) and one part of the following monomer mixture (1) and stirred and mixed in nitrogen flow, and 3 parts of 3% ammonium persulfate was added at 60° C. Then, after elevating the temperature to 80° C., a monomer emulsion comprising 79 parts of the monomer mixture (1), 2.5 parts of "NEWCol 707SF", 4 parts of 3% ammonium persulfate and 42 parts of deionized water was added to the reactor in 4 hours by means of a quantitative pump. After finishing addition, the solution was ripened for one hour.

Monomer Mixture (1):

| | |
|---|---|
| methyl methacrylate | 55 parts |
| styrene | 10 parts |
| n-butyl acrylate | 9 parts |
| 2-hydroxyethyl acrylate and | 5 parts |
| methacrylic acid | 1 part. |

Next, the temperature of the inside of the reactor described above was maintained at 80° C., and 20.5 parts of the following monomer mixture (2) and 4 parts of 3% ammonium persulfate were dropwise added parallel at the same time in 1.5 hour. After finishing addition, the solution was ripened for one hour and filtered at 30° C. through a nylon cloth of 200 mesh. Deionized water was further added thereto, and the pH was controlled to 7.5 by N,N-dimethylethanolamine to obtain an acryl resin aqueous dispersion (W-1) having an average particle diameter of 0.1 μm, a Tg (glass transition temperature) of 46° C. and a non-volatile matter content of 20%.

Monomer Mixture (2):

| | |
|---|---|
| methyl methacrylate | 5 parts |
| n-butyl acrylate | 7 parts |
| 2-ethylhexyl acrylate | 5 parts |
| methacrylic acid and | 3 parts |
| "NEWCol 707SF" | 0.5 part. |

Production Example 14

Preparation of Acryl Resin Aqueous Dispersion (W-2)

A reactor was charged with 60 parts of ethylene glycol monobutyl ether and 15 parts of isobutyl alcohol and heated to 115° C. in nitrogen flow. After reaching 115° C., a mixture of n-butyl acrylate 26 parts, methyl methacrylate 47 parts, styrene 10 parts, 2-hydroxyethyl methacrylate 10 parts, acrylic acid 1 part 6 parts, azobisisobutyronitrile 1 part and butyl cellosolve 115 parts was added in one hour, and then the solution was ripened for 30 minutes and filtered at 50° C. through a nylon cloth of 200 mesh. The resulting reaction product had an acid value of 48 mg KOH/g, a viscosity Z4 (Gardner bubble viscometer), a non-volatile matter content of 55% and a Tg of 45° C. This was equivalently diluted with N,N-dimethylethanol, and deionized water was added thereto, whereby an acryl resin aqueous dispersion (W-2) having a non-volatile matter content of 50% was obtained.

Production Example 15

Coating Material (WB-1) for Water-based Color Base Coat

Mixed were 275 parts of the acryl resin aqueous dispersion (W-1) described above having a non-volatile matter content of 20%, 40 parts of the acryl resin aqueous dispersion (W-2) described above having a non-volatile matter content of 50%, 25 parts of "Cymel 350" (trade name, melamine resin, manufactured by Mitsui Toatsu Chemical Co., Ltd.), 20 parts of "Alumi Paste AW-500B" (trade name, metallic pigment, manufactured by Asahi Kasei Metals Co., Ltd.), 20 parts of ethylene glycol monobutyl ether and 253 parts of deionized water, and "Ticsol K-130B" (trade name, thickener, manufactured by Kyoei Yushi Chemical Ind. Co., Ltd.) was added thereto to control the viscosity to 3000 Pa·s (millipascal·second) measured by means of a B type viscometer (rotor revolution: 6 rpm), whereby a coating material (WB-1) for a water-based color base coat having a non-volatile matter content of about 19% was obtained.

2. Examples and Comparative Examples

A resin mixed solution was prepared in a composition (shown in terms of a solid matter amount ratio) shown in the following Table 1, and a green coating material obtained by adding 2 parts of an equivalent blended matter (curing catalyst (C)) of tetrabutylammonium bromide and monobutylphosphoric acid, 1 part of "Tinuvin 900" (trade name, UV absorber, manufactured by Ciba Geigy Co., Ltd.) and 0.1 part of "BYK 300" (trade name, surface controlling agent, manufactured by Bic Chemie Co., Ltd.) per 100 parts of the resin mixed solution was diluted with n-butanol and controlled to a viscosity of 30 seconds (Ford cup #4/20° C.) to obtain curable resin compositions (including compositions for comparison) (clear top coating materials).

TABLE 1

| | | Example | | Comparative Example | | | |
|---|---|---|---|---|---|---|---|
| | | 1 | 2 | 1 | 2 | 3 | 4 |
| Component (A) | Name | A-1 | A-2  A-3 | A-4 | A-5 | A-6 | A-7 |
| | Amount | 50 | 25  25 | 50 | 50 | 50 | 50 |
| Component (B) | Name | B-1 | B-1 | B-1 | B-1 | B-1 | B-1 |
| | Amount | 50 | 50 | 50 | 50 | 50 | 50 |
| Component (C): catalyst | | 2 | 2 | 2 | 2 | 2 | 2 |

Example 3

The same procedure as in Example 1 was carried out to obtain a curable resin composition, except that "(A-1) 50 parts" was changed to "(D-1) 50 parts".

3. Performance Test

An epoxy resin base cationically electrodepositable coating material was electrodepositably coated on a dull steel plate having a thickness of 0.8 mm subjected to chemical conversion treatment with zinc phosphate so that a film thickness was about 20 μm and heated at 170° C. for 20 minutes to cure a coating film. Further, the coated face was rubbed with a #400 sand paper and defatted by wiping with petroleum benzene, and then an intermediate coating surfacer for automobiles (polyester resin•melamine resin base organic solvent type) was coated by means of an air spray so that a film thickness was about 25 μm and cured by heating at 140° C. for 30 minutes. Further, the coated face was water-rubbed with a #400 sand paper, dripped, dried and defatted by wiping with petroleum benzene to obtain a material for testing (material to be coated).

The coating material (WB-1) for a water-based color base coat prepared above was coated on the surface of the above material to be coated so that a film thickness was 20 μm and dried at a room temperature for 5 minutes, and then the curable resin compositions (clear top coating materials) obtained in the examples and the comparative examples were coated on the non-cured coated face so that a film thickness was about 40 μm and heated at 140° C. for 30 minutes to cure both coating films at the same time, whereby a double layer top coating film was cured.

The top coating films on the coated test plates thus obtained were subjected to various performance tests. The results thereof are shown in Table 2.

The performance tests shown in Table 2 were carried out by the following methods.

Electrical Resistance Value:

An electrical resistance value (20° C.) of the curable resin composition prepared by mixing the respective components shown in Table 1 and diluting the mixture with n-butanol to control a viscosity to 30 seconds (Ford cup #4/20° C.) was measured by means of "Lanbarg 234 type Paint Conducting Tester" (trade name, manufactured by Lanbarg Co., Ltd.). A shows that the electrical resistance value is 0.3 MΩ or more, and B shows that the electrical resistance value is less than 0.3 MΩ. If the resistance value is less than 0.3 MΩ, short circuit is caused in electrostatically coating in a certain case, and therefore it is not preferred.

Yellowing Property:

The coated test plate described above obtained by heating and curing was further heated (over-baked) at 160° C. for one hour, and then the degree of a discoloration in the coated face was visually observed. A shows that discoloration is not observed at all; B shows that yellowing is observed a little; and C shows that yellowing is notably observed.

Hardness:

It is a hardness of the double layer coating film, and the tucon hardness at 20° C. was measured. It is shown that the larger the numerical value is, the harder the coating film is. A shows 10 or more; B shows 5 to less than 10; and C shows 1 to less than 5.

Car Wash Scratching Property:

The coated test plate described above was stuck on an outside roof face of a car with the coated face turned to the outside and subjected continuously 15 times to car washing by means of a car-washing machine, and then the coated face of the test plate was visually observed. "P020 FWRC" (trade name, manufactured by Yasui Sangyo Co., Ltd.) was used as the car-washing machine. A shows that scratches are scarcely observed to be caused; B shows that scratches are a little observed to be caused; and C shows that many scratches are observed to be caused.

Storage Stability:

The curable resin composition (clear top coating material) which was control to a viscosity of 30 seconds (Ford cup #4/20° C.) was stored at 40° C. for 2 weeks, and then the degree of a rise in the viscosity was observed. A shows that the viscosity after storage is 40 seconds (Ford cup #4/20° C.) or less; B shows that the viscosity after storage is 40 to 60 seconds (Ford cup #4/20° C.); and C shows that the viscosity after storage is 60 seconds or more (Ford cup #4/20° C.).

TABLE 2

|  | Example | | | Comparative Example | | | |
| --- | --- | --- | --- | --- | --- | --- | --- |
|  | 1 | 2 | 3 | 1 | 2 | 3 | 4 |
| Electrical resistance value | A | A | A | A | A | B | B |
| Yellowing property | A | A | A | A | A | B | B |
| Hardness | A | A | A | A | C | A | A |
| Car wash scratching property | A | A | A | C | A | A | C |
| Storage stability | A | A | A | A | A | B | B |

The invention claimed is:

1. A curable resin composition comprising:
(A) a carboxyl group-containing acryl resin having (a) a carboxyl group originating in a carboxyl group-containing polymerizable unsaturated monomer selected from the group consisting of acrylic acid, methacrylic acid, maleic acid and itaconic acid and (b) a carboxyl group originating in a carboxyl group-containing polymerizable unsaturated monomer having a polymerizable carbon-carbon double bond and a carboxyl group separated from the double bond by at least 6 carbon atoms, which is obtained by subjecting a hydroxyl group-containing polymerizable unsaturated monomer to semi-esterification with saturated dicarboxylic acids;
(B) an epoxy group-containing acryl resin and
(C) a curing catalyst,
the component (A) having an acid value of 30 to 150 mg KOH/g based on the monomer (a), an acid value of 50 to 140 mg KOH/g based on the monomer (b) and a total acid value of 130 to 180 mg KOH/g, and
the component (C) comprising a combination of a quaternary ammonium salt and a phosphate base compound.

2. The resin composition as described in claim 1, wherein the monomer (b) is a carboxyl group-containing polymerizable unsaturated monomer having a polymerizable carbon-carbon double bond and a carboxyl group separated from the double bond by 6 to 25 carbon atoms.

3. The resin composition as described in claim 1, wherein the component (A) is obtained by copolymerizing the carboxyl group-containing polymerizable unsaturated monomer (a), the carboxyl group-containing polymerizable unsaturated monomer (b) and an acryl base monomer (c) and, if necessary, other polymerizable monomer (d).

4. The resin composition as described in claim 3, wherein plural carboxyl group-containing polymerizable unsaturated monomers in which atomic groups present between a polymerizable carbon-carbon double bond and a carboxyl group have carbon atom numbers different from each other are used as the carboxyl group-containing polymerizable unsaturated monomer (b).

5. The resin composition as described in claim 3, wherein plural carboxyl group-containing polymerizable unsaturated monomers in which atomic groups present between a polymerizable carbon-carbon double bond and a carboxyl group have carbon atom numbers different from each other are separately used as the carboxyl group-containing polymerizable unsaturated monomer (b), and the resulting plural carboxyl group-containing acryl resins are used as the component (A).

6. The resin composition as described in claim 1, wherein the component (B) is obtained by copolymerizing an epoxy group-containing polymerizable monomer and an acryl base monomer and, optionally, a hydroxyl group-containing polymerizable monomer and/or other polymerizable monomer.

7. The resin composition as described in claim 1, wherein the component (B) has a weight average molecular weight of 2000 to 50000 and an epoxy equivalent of 50 to 1000.

8. The resin composition as described in claim 1, comprising 20 to 80% by weight of the component (A) and 80 to 20% by weight of the component (B) based on the total solid matter weight of the component (A) and the component (B).

9. The resin composition as described in claim 1, comprising 0.1 to 5 parts by weight of the component (C) per 100 parts by weight of the total solid matter of the component (A) and the component (B).

10. A top coating material comprising the resin composition as described in claim 1.

* * * * *